Patented June 30, 1953

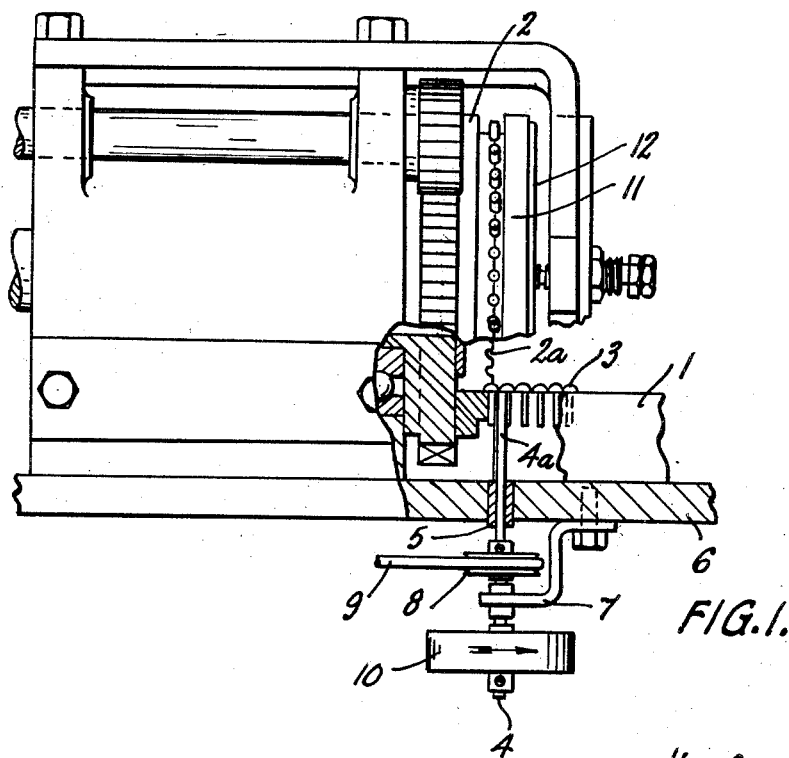
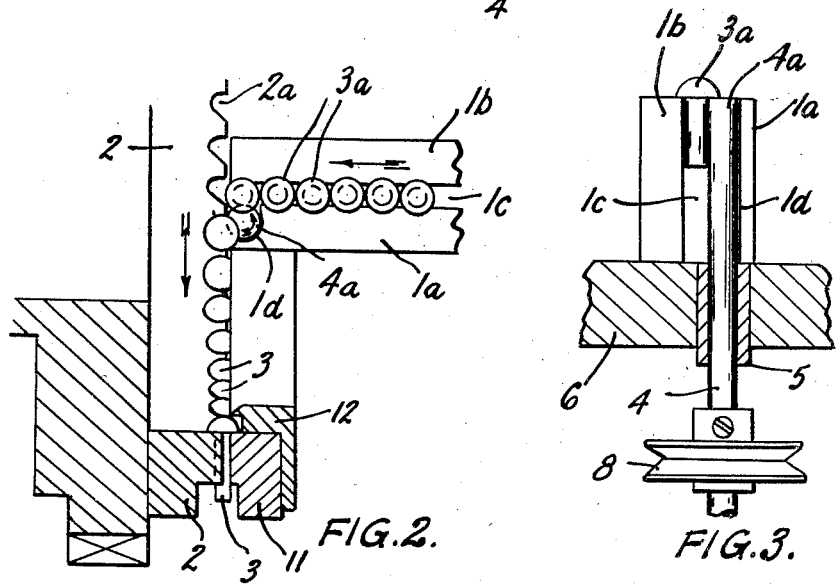

2,643,404

UNITED STATES PATENT OFFICE 2,643,404

SCREW OR LIKE FEEDING MEANS

Victor Hill Fray, Auckland, New Zealand

Application April 20, 1950, Serial No. 157,078
In New Zealand August 16, 1949

6 Claims. (Cl. 10—165)

1

This invention relates to screw or like nicking machines of the type as described in my previous U. S. A. patent application Serial No. 72,215 of January 22, 1949, now Patent No. 2,621,343 issued December 16, 1952, and has for its objects the provision of a further piece of mechanism to such apparatus to ensure that the feed of blanks will enter the slots of the carrier drum without being subject to occasional blockage due to the jamming of a blank between the drum and the chute conveying the blanks to said drum.

The screw nicking apparatus while effectively handling thousands of blanks over long periods, is subject to occasional jamming which causes mutilation of a blank and also straining of the adjustment of the machine, this being caused by a blank getting caught between a corner of the blank receiving slots of the carrier drum and the corner of the chute from which the blanks are being fed into such slots, because of the blank being too slow in moving into the slot.

The present invention has been devised to ensure that the blanks on reaching the end of the chute to position to be next for entry to the carrier drum, will separately be each given additional push which will ensure that on an empty slot being available, the blank will be pushed thereinto in the exceedingly small interval of time before the slot has passed the position of open entry thereto.

Broadly the invention comprises improvements in screw or like nicking machines wherein at the end of the chute which terminates just clear of the carrier drum and which conveys the blanks to the slots in such carrier drum, power driven rotatable roller means are provided to present the corner of the trailing bar of such chute.

In describing the invention reference will be made to the accompanying drawing in which:

Figure 1 shows a side elevation of the screw nicking machine with a portion of same broken away back to the centre line to show the roller mechanism applied thereto, Figure 2 is an enlarged sectional plan view of the carrier drum with the nicking saw removed to enable the end of the chute to be seen feeding the blanks into the carrier drum and Figure 3 is an enlarged end elevation of the chute as seen from the delivery end thereof.

In the invention, the additional mechanism is applied to the end of the known form of chute 1 composed of two parallel bars 1a and 1b with a space 1c between, which conveys the blanks from the hopper-feed apparatus and which terminates just clear of contact with the carrier drum 2.

2

At that side of bar 1a of such delivery end of the chute 1 which is the trailing side thereof from which the slots 2a of te drum 2 pass in carrying the blanks 3 away from the chute 1, the bar 1a forming such side is cut away 1d only sufficiently to enable a vertical roller to be introduced, this roller 4a preferably constituting the top end of a vertical drive spindle 4 which passes down through a bearing 5 in the bedplate 6 to receive additional lower support by a bearing bracket 7 which is secured under the bedplate 6, such spindle 4 being adapted to receive suitable power drive as by pulley 8 and belt 9, a flywheel 10 being secured to the spindle 4 in addition to the pulley 8.

The top of the roller 4a terminates at a level which coincides with that of the chute bars 1a and 1b on which the heads 3a of the blanks 3 rest and along which said blanks travel and thus the roller 4a presents a curved edge from which the blanks 3 leave the chute 1 in turning the right angle corner in their passage into the carrier drum slots 2a.

The retaining plate 11 and its attached head retaining segment 12 commence their engagement with the blanks 3 directly alongside the bar 1a of the chute 1 and take any outward thrust of the bar 1a by being in close contact with the outer side of the latter.

In use or operation, the roller spindle 4 with integral roller 4a is rotated at such speed that its periphery travels at a speed considerably in excess of the speed of travel of the slotted portion of the carrier drum 2 and such rotation of the roller 4a as indicated by the arrow in Fig. 2 is in the direction which pushes the blanks 3 into the carrier drum slots 2a.

Accordingly, apart from the normal push applied to the blanks 3 at the delivery end of the chute 1 by the other blanks behind same, the end blank 3 will also rest on the rotating roller 4a and this is adding a considerable further degree of push to the blank 3 towards the carrier drum 2, along with imparting spin or rotation to the blank because of one side of its head 3a resting on this rotating roller 4a.

When a slot 2a in the carrier drum 2 coincides with the delivery end of the chute 1, the blank 3 is literally slammed into same, even though the interval of time available is exceedingly small in view of the fact that the slots 2a pass the chute 1 at the rate of hundreds per minute.

The roller rotation causing spin of the blank 3 also results in the latter itself effecting a rolling motion which would convey it into the slot 2a as soon as presented and therefore if even a minute delay should occur which normally would tend to result in a jam taking place, the roll of the blank 3 assisted by rotation of the roller 4a would force the blank in the rolling manner into the carrier drum slot 2a at the instant when an incipient jam commenced, the flywheel 10 storing kinetic energy which is available at the instant of an incipient jam to keep the roller 4a rotating to thus ensure the entry of the blank 3 without fail to a slot 2a in the carrier drum 2.

I claim:

1. In a device for feeding headed articles, the combination of two horizontally spaced inclined surfaces upon which said articles are adapted to slide while suspended therefrom by their heads, a roller adjacent to the lower end of one of said surfaces, means for supporting said roller for rotation about an axis normal to the plane of said adjacent surface, said roller having an annular surface normal to its axis of rotation forming a continuation of said adjacent surface, and means for rotating said roller in a direction to continue the movement of said articles in the direction in which they move along said surface.

2. In a device for feeding headed articles, the combination of inclined chute means comprising two horizontally spaced surfaces upon which said articles are adapted to slide while suspended therefrom by their heads, said chute means having a cutaway portion at the delivery end of one of said surfaces a roller in said cutaway portion supported for rotation about an axis normal to the plane of said adjacent surface, said roller having an annular surface normal to its axis of rotation forming a continuation of said adjacent surface, and means for rotating said roller in a direction to continue the movement of said articles in the direction in which they move along said surface.

3. In a screw and like nicking machine comprising a cylindrical carrier drum rotatable about a non-vertical axis and having radial slots in one end or face adapted to receive headed blanks, inclined chute means comprising spaced bar or side members terminating adjacent to said slots for conveying and feeding blanks to said slots while suspended therefrom by their heads, said chute means having a cutaway portion at the delivery end on the trailing side, a rotatable roller located on said cutaway portion and having an annular surface normal to its axis of rotation forming a continuation of said chute means, and means for rotating said roller in a direction to move blanks positioned thereon into said slots and a peripheral speed in excess of the peripheral speed of that portion of said carrier drum adjacent.

4. In a screw and like nicking machine comprising a bed plate, a cylindrical carrier drum rotatable about a non-vertical axis and having radial slots in one end or face adapted to receive headed blanks, inclined chute means terminating adjacent to said slots for conveying and feeding blanks to said slots in said carirer drum while suspended in said chute means by their heads, a bearing in said bed plate, a spindle in said bearing having its upper end terminating adjacent to the lower end of said chute means at the trailing side and its axis generally perpendicular to said carrier drum axis, a flywheel on said spindle, and means for driving said spindle in a direction to cause said roller to move blanks positioned thereon into said slots and at a speed such that the peripheral speed of said roller is in excess of the peripheral speed of that portion of said carrier drum adjacent thereto.

5. In a screw and like nicking machine comprising a cylindrical carrier drum rotatable about a non-vertical axis and having radial slots in one end or face adapted to receive headed blanks, means terminating adjacent to said slots for conveying and feeding blanks to said slots in said carrier drum, said means including horizontally spaced surfaces upon which said blanks are carried while suspended therefrom by their heads, a roller located adjacent to the delivery end of said means and interposed between said drum and said surface at the trailing side of said means and having an annular surface normal to its axis of rotation forming a continuation of said surface, and means for rotating said roller in a direction to move blanks positioned thereon into said slots and at a peripheral speed in excess of the peripheral speed of that portion of said carrier drum adjacent thereto.

6. In a screw and like nicking machine comprising a cylindrical carrier drum rotatable about a non-vertical axis and having radial slots in one end or face adapted to receive headed blanks, inclined chute means terminating adjacent to said slots for conveying and feeding blanks to said slots in said carrier drum, said chute means including horizontally spaced inclined surfaces upon which said blanks slide while suspended therefrom by their heads, a roller located adjacent to the lower end of said chute means and having one end thereof interposed between said drum and said surface at the trailing side of said chute and having an annular surface normal to its axis of rotation forming a continuation of said surface, and means for rotating said roller in the direction to move blanks positioned thereon into said slots.

VICTOR HILL FRAY.

References Cited in the file of this patent

UNITED STATES PATENTS

| Number | Name | Date |
|---|---|---|
| 1,446,024 | Tornquist | Feb. 20, 1923 |
| 2,103,387 | Salfisburg | Dec. 28, 1937 |
| 2,108,163 | Clark | Feb. 15, 1938 |